United States Patent
Kato et al.

[11] Patent Number: 5,879,791
[45] Date of Patent: Mar. 9, 1999

[54] WET TYPE SLIDING APPARATUS COMPRISING THRUST BEARING

[75] Inventors: Eiji Kato; Shoji Yasunaga; Hidehiko Tamura; Tadashi Tanaka, all of Nagoya, Japan

[73] Assignee: Daido Metal Company Ltd., Nagoya, Japan

[21] Appl. No.: 719,369

[22] Filed: Sep. 25, 1996

[30] Foreign Application Priority Data

Oct. 2, 1995 [JP] Japan ................................ 7-279594

[51] Int. Cl.$^6$ ............... F16C 33/20; B32B 25/02
[52] U.S. Cl. ................... 428/295.1; 428/297.4; 428/307.3; 428/339; 428/421; 428/422; 428/457; 428/463; 384/297; 384/300; 384/907; 384/908
[58] Field of Search ............. 428/295.1, 411.1, 428/421, 457, 463, 297.4, 307.3, 422, 339; 384/297, 300, 907, 908

[56] References Cited

FOREIGN PATENT DOCUMENTS 58-160346  9/1983  Japan.
5302620  11/1993  Japan.

*Primary Examiner*—Marion McCamish
*Assistant Examiner*—Jason Savage
*Attorney, Agent, or Firm*—Browdy and Neimark

[57] ABSTRACT

A wet type sliding apparatus comprising a thrust bearing which operates in the presence of a lubricating liquid, wherein the thrust bearing has a sliding surface composed of a resin composition comprising a carbon fiber, a fluorocarbon polymer and a thermoplastic resin other than fluorocarbon polymer, the carbon fiber content being 10 to 45% by weight based on the weight of the composition and the fluorocarbon polymer content being 0.1 to 8.5% by weight based on the weight of the composition, the thrust bearing in said wet type sliding apparatus being excellent in wear resistance, mechanical strength and friction coefficient at the time of starting even under a high load.

17 Claims, 3 Drawing Sheets

WET TYPE SLIDING APPARATUS COMPRISING THRUST BEARING

BACKGROUND OF THE INVENTION

This invention relates to a wet type sliding apparatus, and more particularly, to a wet type sliding apparatus comprising a thrust bearing excellent in wear resistance which operates in the presence of a lubricating liquid (lubricating oil or lubricating water). As a wet type sliding apparatus comprising a thrust bearing which operates in the presence of a lubricating liquid, there are various ones used in a generator, a pump, a turbine, a compressor, a transmission and the like. This invention uses a thrust bearing having a specific sliding surface to improve such a wet type sliding apparatus.

Aromatic polyetherketone resins or polyarylene sulfide resins are engineering resins having excellent heat resistance, mechanical properties and wear resistance. However, when the aromatic polyetherketone resin or polyarylene sulfide resin per se has a high friction coefficient, the application thereof to the sliding member which is one of the constituents of a bearing is difficult, so that a sliding member having a low friction coefficient has heretofore been developed by using the aromatic polyetherketone resin as the base material and adding thereto a resin having a low friction coefficient such as a fluorocarbon polymer or the like. On the other hand, however, this development has resulted in a deterioration of wear resistance and mechanical strength because the fluorocarbon polymer is contained.

As a technique concerning these aromatic polyetherketone resin systems, there is known the technique disclosed in JP-A 58(1983)-160,346. In this prior art, as a sliding member of a dry type sliding apparatus in which no lubricating liquid is used, there is stated a resin composition comprising a thermoplastic aromatic polyetherketone resin as a base material, 2.5 to 60% by weight of a fluorocarbon polymer and 2.5 to 60% by weight of a carbon fiber. However, the composition range in which the practical heat distortion temperature (HDT) and limiting PV value have been actually confirmed is only 10 to 40% by weight of a fluorocarbon polymer (polytetrafluoroethylene) and 10 to 40% by weight of a carbon fiber. When a composition of 2% by weight of a fluorocarbon polymer and 18% by weight of a carbon fiber is used in the bearing of a copying machine, it has been confirmed that a creak is generated and the revolution becomes unusual (see Comparative Example 3 in the above prior art reference) and it is suggested that the amount of the fluorocarbon polymer becoming small is not desirable.

Recently, the area of the pad used in the thrust bearing which operates in the presence of a lubricating liquid and is incorporated into a generator or pump has been made small accompanying the tendency of miniaturization of apparatus, and a high specific load has come to apply to the pad. A thrust bearing applied under such severe conditions is required to have various properties such as high wear resistance and the like in addition to its excellent sliding characteristics under wet lubrication. In the case of, for example, a thrust bearing used in apparatus in which starting and stopping are repeatedly effected, only a small amount of a lubricating liquid is present at the time of starting, and hence, the thrust bearing is partially in solid contact with a counter member at the time of the starting, so that not only does a large starting power become necessary, but also, there is a fear that the sliding surface is damaged by the solid contact. Therefore, the thrust bearing is required to have, in addition to high wear resistance during operating, a small friction coefficient at the time of the starting and also have a high mechanical strength as well as excellent wear resistance. The wear resistance in the wet system should be such that the wear is 4 μm or less, particularly 2 μm or less, as determined by a change in thickness of test sample before and after a test in which a counter member is rotated for 30 seconds in an oil bath by, for example, a friction-wear tester and then rested for 300 seconds and this cycle is repeated 15 times (see Table 2 which appears hereinafter).

However, the wear resistance and mechanical strength stated about 10 to 40% by weight of a fluorocarbon polymer (polytetrafluoroethylene) and 10 to 40% by weight of a carbon fiber which are in the range of the best mode of the above-mentioned prior art relating to the dry type technique have not been sufficient. Moreover, as discussed above, in Comparative Example 3 of the above-mentioned prior art reference, it has been confirmed that when a composition consisting of 2% by weight of a fluorocarbon polymer and 18% by weight of a carbon fiber is used in the bearing of copying machine, a creak is generated and the rotation becomes unusual and it is stated that when the amount of the fluorocarbon polymer is 2% by weight, the composition is inappropriate as a sliding member. Furthermore, in the dry type prior art, when the amount of PTFE is less than 10% by weight, no sufficient lubricity is actually obtained.

SUMMARY OF THE INVENTION

The present inventors have made extensive research on the above-mentioned problems and have consequently found that the wear resistance is improved by adding a fluorocarbon polymer to the aromatic polyetherketone resin or polyarylene sulfide resin which constitutes the sliding surface of a thrust bearing which operates in the presence of a lubricating liquid and receives a high specific load and that contrary to the prior art, when the amount of the fluorocarbon polymer added is 2% by weight the wear resistance reaches the best; when the amount is further increased the wear resistance is rather lowered; and when the amount is 10% by weight or more the wear resistance becomes substantially constant. This invention has achieved the object of reducing the wear in the wet system in such a composition range that sufficient characteristics cannot be exerted in the wet system.

It is an object of this invention to provide a wet type sliding apparatus comprising a thrust bearing excellent in wear resistance, mechanical strength and friction coefficient at the time of starting, which operates in the presence of a lubricating liquid.

It is a further object of this invention is to provide a wet type sliding apparatus in which the wear according to the above-mentioned friction-wear test becomes 4 μm or less, preferably 2 μm or less.

Other objects and advantages of this invention will become apparent from the following description.

According to this invention, there is provided a wet type sliding apparatus comprising a thrust bearing which operates in the presence of a lubricating liquid, wherein the thrust bearing has a sliding surface composed of a resin composition comprising a carbon fiber, a fluorocarbon polymer and a thermoplastic resin other than fluorocarbon polymer, the carbon fiber content being 10 to 45% by weight based on the weight of the resin composition and the fluorocarbon polymer content being 0.1 to 8.5% by weight based on the weight of the resin composition.

BRIEF DESCRIPTION OF THE DRAWINGS

In FIG. 4, 1 refers to a revolving shaft, 2 to a thrust bearing, 3 to the lubricating oil-introducing portion, 4 to the oil face and 5 to an oil tank.

DETAILED DESCRIPTION OF THE INVENTION

Figure 1:
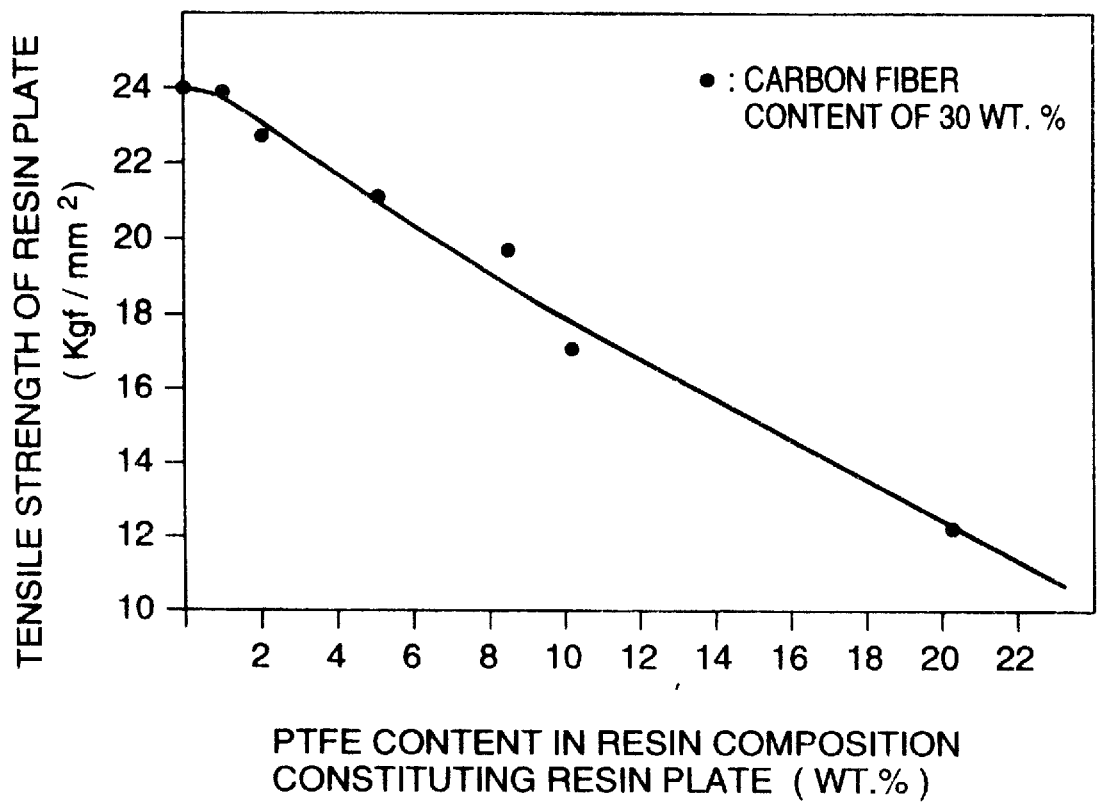
FIG. 1 is a graph showing a relation between the PTFE content in a resin composition constituting the resin plate used in the Examples and the Comparative Examples and the tensile strength of the resin plate.

The theremoplastic resin referred to herein includes aromatic polyetherketone resins, polyarylene sulfide resins, polyamide resins, polyacetal resins and the like.

The aromatic polyetherketone resin referred to herein is a crystalline thermoplastic aromatic resin comprising a constructive unit represented by formula (1) alone or in combination with at least one of the constructive units represented by formulas (2), (3) and (4):

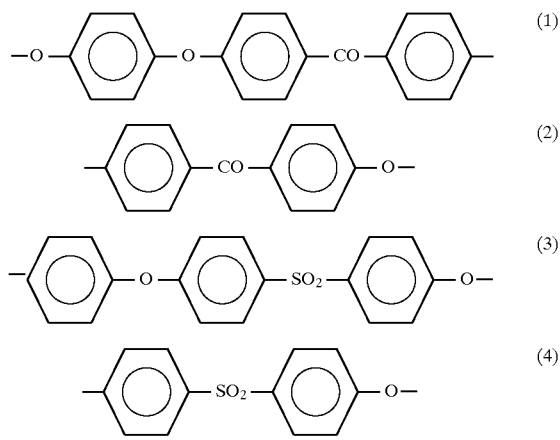

As the above aromatic polyetherketone resin, a polyetheretherketone (referred to hereinafter as PEEK) can be used, and PEEK is particularly preferable in respect of mechanical strength and heat resistance. PEEK can be prepared by, for example, the method disclosed in JP-A 54(1979)-90,296 and has preferably a melt flow index in the range of from 1 to 5 g/10 min as measured at 360° C. under a load of 2.16 kg according to ASTM D1238.

As the polyarylene sulfide resin, polyphenylene sulfide (referred to hereinafter as PPS) can be used. As the PPS, there may be used a polymer whose main structure consists of a recurring unit represented by formula (5) and this PPS includes polymers of the cross-linking type, the straight chain type and the semi-cross-linking type:

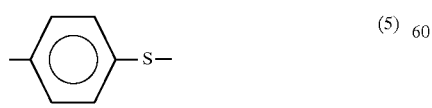

As the fluorocarbon polymer, there can be used polytetrafluoroethylene (PTFE), polytetrafluoroethylene-hexafluoropropylene copolymer (FEP), polychlorotrifluoroethylene (PCTFE), tetrafluoroethylene-perfluoroalkyl vinyl ether copolymer (PFA) and the like, and PTFE is particularly preferred in view of low friction.

When the fluorocarbon polymer content is less than 0.1% by weight, no sufficient effect of the fluorocarbon polymer is exerted and the wear resistance is low, while when it is more than 8.5% by weight. Therefore, the fluorocarbon polymer content should be 0.1 to 8.5% by weight, and is preferably 0.1 to 5% by weight, more preferably 0.5 to 2.3% by weight. When the fluorocarbon polymer content is about 2% by weight, the best wear resistance is exerted.

As the carbon fiber, there can be used any of pitch-based carbon fibers, cellulose-based carbon fibers, polyacrylonitrile-based carbon fibers and the like, and particularly preferable are polyacrylonitrile-based carbon fibers in view of friction and wear. The length of the fiber is preferably 0.1 to 10 mm, and usually, carbon fibers having an average length of about 6 mm are used.

When the carbon fiber content is less than 10% by weight, no desired mechanical strength is obtained. On the other hand, when it exceeds 45% by weight, the molding of the resin composition becomes difficult. Therefore, the carbon fiber content should be 10 to 45% by weight, and particularly preferable is 25 to 35% by weight because the resin composition having said carbon fiber content has a good moldability and also a high mechanical strength.

It is desirable that each of the aromatic polyetherketone resin, fluorocarbon polymer and carbon fiber is uniformly dispersed in the resin composition, and hence, these constituents are mixed by an appropriate method such as by previously mixing them in a mixer so that they are contained in the desired proportions and then feeding the mixture to a melt-extruder, or the like.

In this invention, the above resin composition may be molded alone to form a thrust bearing, or alternatively, a porous sintered layer backed with a backing metal may be impregnated and coated with the resin composition to form the sliding surface of a thrust bearing.

As explained above, according to this invention, a wet type sliding apparatus comprising a thrust bearing which operates in the presence of lubricating-liquid and which is excellent in wear resistance can be obtained by forming the sliding surface of the thrust bearing from a resin composition comprising a carbon fiber, a fluorocarbon polymer and a thermoplastic resin other than fluorocarbon polymer in which composition the carbon fiber content is 10 to 45% by weight based on the resin composition and the fluorocarbon polymer content is 0.1 to 8.5% by weight of the resin composition.

Incidentally, according to this invention, the sliding surface of the thrust bearing can be prevented from being damaged by the solid contact between the counter member and the thrust bearing at the time of the starting.

According to this invention, the sliding surface of the thrust bearing can be made excellent in wear resistance by impregnating and coating the porous sintered layer backed with a backing metal with the above resin composition.

DESCRIPTION OF THE PREFERRED EMBODIMENTS

Examples together with Comparative Examples are shown below to explain this invention in more detail.

Examples 1 to 13 and Comparative Examples 1 to 6

First of all, a uniformly compounded resin in the form of pellet which resin consisted of each of the compositions shown in Table 1 was molded into a resin plate having a thickness of 5 mm by means of an injection machine.

TABLE 1

| Sample No. | Composition | | | Chsracteristics | | |
|---|---|---|---|---|---|---|
| | Balance | Carbon fiber (wt. %) | PTFE (wt. %) | Tensile strength (Kgf/mm$^2$) | Friction coefficient at the time of starting | Amount of wear ($\mu$m) |
| Example | | | | | | |
| 1 | PEEK | 30 | 1.0 | 24.0 | 0.11 | 3.0 |
| 2 | PEEK | 30 | 2.0 | 23.8 | 0.10 | 1.4 |
| 3 | PEEK | 30 | 5.0 | 21.2 | 0.09 | 2.1 |
| 4 | PEEK | 30 | 8.5 | 19.5 | 0.08 | 3.6 |
| 5 | PEEK | 10 | 0.1 | 16.8 | 0.11 | 4.0 |
| 6 | PEEK | 10 | 0.5 | 16.5 | 0.10 | 3.3 |
| 7 | PEEK | 10 | 1.0 | 16.3 | 0.10 | 3.4 |
| 8 | PEEK | 10 | 8.5 | 15.9 | 0.08 | 3.7 |
| 9 | PEEK | 45 | 0.5 | 26.1 | 0.10 | 3.0 |
| 10 | PEEK | 45 | 8.5 | 20.1 | 0.08 | 2.8 |
| 11 | PEEK | 20 | 5.0 | 18.5 | 0.11 | 2.7 |
| 12 | PPS | 20 | 2.0 | 18.1 | 0.10 | 2.9 |
| 13 | PPS | 30 | 8.5 | 20.2 | 0.08 | 3.7 |
| Comp. Ex. | | | | | | |
| 1 | PEEK | 30 | 0 | 24.1 | 0.13 | 7.2 |
| 2 | PEEK | 30 | 10 | 17.2 | 0.08 | 6.9 |
| 3 | PEEK | 30 | 20 | 12.5 | 0.08 | 6.7 |
| 4 | PEEK | 10 | 10 | 12.5 | 0.08 | 7.2 |
| 5 | PPS | 20 | 10 | 13.1 | 0.08 | 6.1 |
| 6 | PPS | 10 | 20 | 9.5 | 0.08 | 11.0 |

In Table 1, PEEK was used as the aromatic polyetherketone resin and PPS was used as the polyarylene sulfide resin. As the PEEK, PEEK 450G (a trade name of ICI in U.K., melt flow index: 3.1 g/10 min) was used. As the PPS, Ryton P-4 (a trade name of Phillips) was used. As the fluorocarbon polymer, PTFE (TLP-10, a trade name of Mitsui Dupont-Fluorochemical Co. Ltd.) was used. Moreover, as the carbon fiber, Torayca MDL (a trade name of TORAY INDUSTRIES CO. LTD.) was used.

The resin plates obtained in the Examples and the Comparative Examples were subjected to a tensile test to obtain the results shown in Table 1. Also, the influence of the PTFE content on the tensile strength when the carbon fiber content is 30% by weight is shown as a graph in FIG. 1. From the graph, it is clear that as the PTFE content is increased, the tensile strength is lowered and a lower PTFE content is more desirable.

Subsequently, a copper alloy powder was spread in a thickness of 0.5 mm on a copper-plated steel plate having a thickness of 3 mm and sintered to form a porous sintered layer. The above-mentioned resin plate was put on the porous sintered layer heated at a temperature of 350° to 400° C. and the resulting assembly was pressure-bonded by a press to impregnate and coat the porous sintered plate with the resin. Subsequently, the resulting plate was machined to a washer shape having an outer diameter of 27.2 mm and an inner diameter of 22 mm, thereby obtaining test samples for the Examples and the Comparative Examples.

The test samples obtained in the Examples and the Comparative Examples were subjected to a friction-wear test under the test conditions shown in Table 2 by the Suzuki type friction-wear tester. In the test, a counter member was rotated for 30 seconds and rested for 300 seconds in an oil bath and this cycle was repeated 15 times, in which the friction coefficient at the time of the starting was measured on the last 5 of the 15 cycles. The average of the 5 values obtained was taken as a friction coefficient. The amount of wear was determined by measuring the thicknesses of the test sample before and after the test and calculating the difference between both thicknesses. The test results obtained are shown in Table 1.

TABLE 2

| Test conditions | Dimension | Unit |
|---|---|---|
| Test sample size | φ27.2 × φ22 | mm |
| No. of revolution | 1,500 | rpm |
| Peripheral speed | 2 | m/sec |
| Lubricant | VG46 | — |
| Lubricant temp. | 55 | °C. |
| Lubricating method | Oil bath | — |
| Counter member | S45C | — |
| Roughness | 1.0 | R$_{max}$ $\mu$m |
| Hardness | 180—220 | Hv10 |
| Pressure | 8 | MPa |

Figure 2:
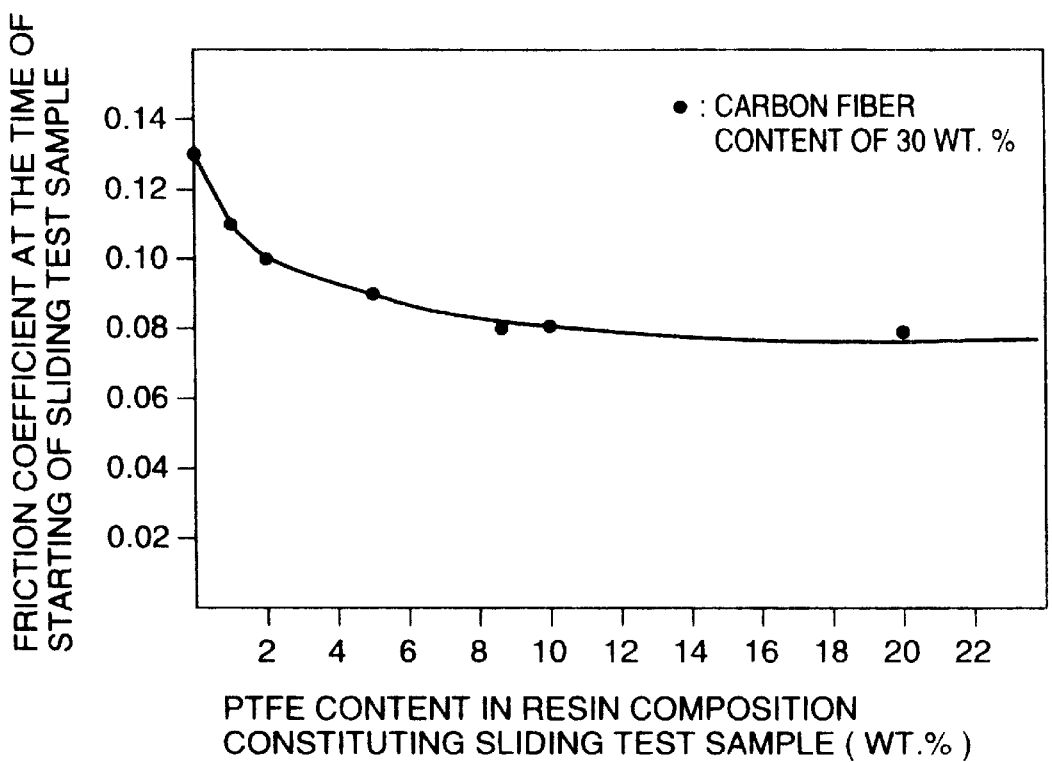
FIG. 2 is a graph showing a relation between said PTFE content and the friction coefficient at the time of starting of the resin plate (sliding surface).
Figure 3:
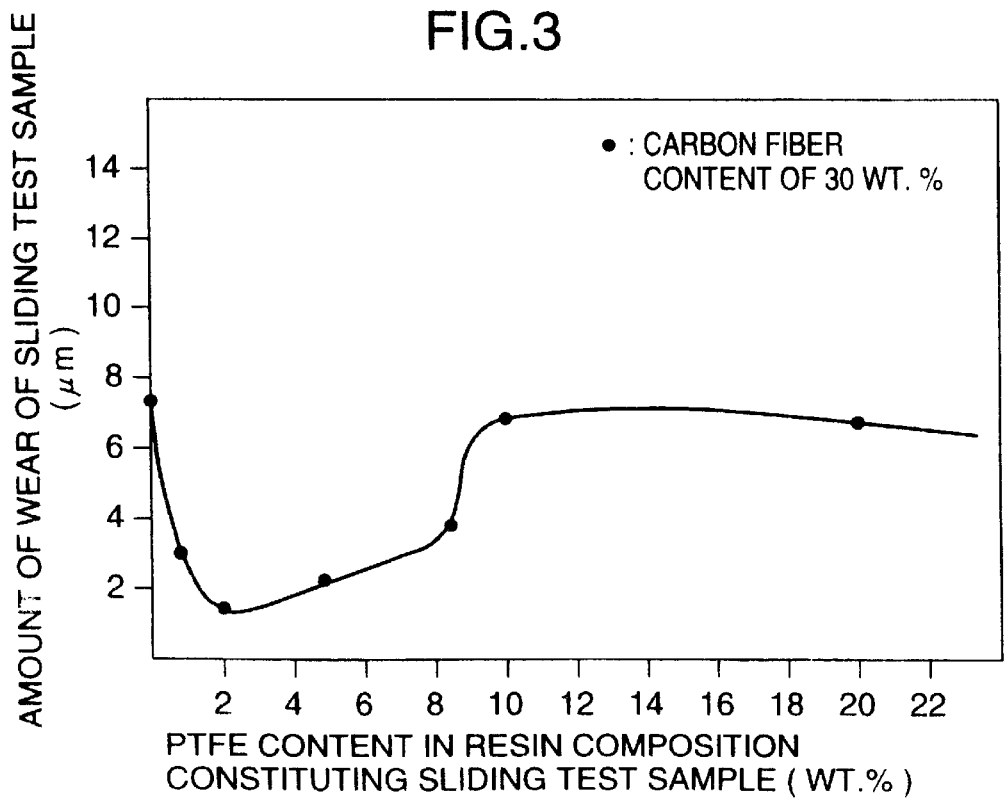
FIG. 3 is a graph showing a relation between the above PTFE content and the wear of the sliding test sample.
Figure 4:
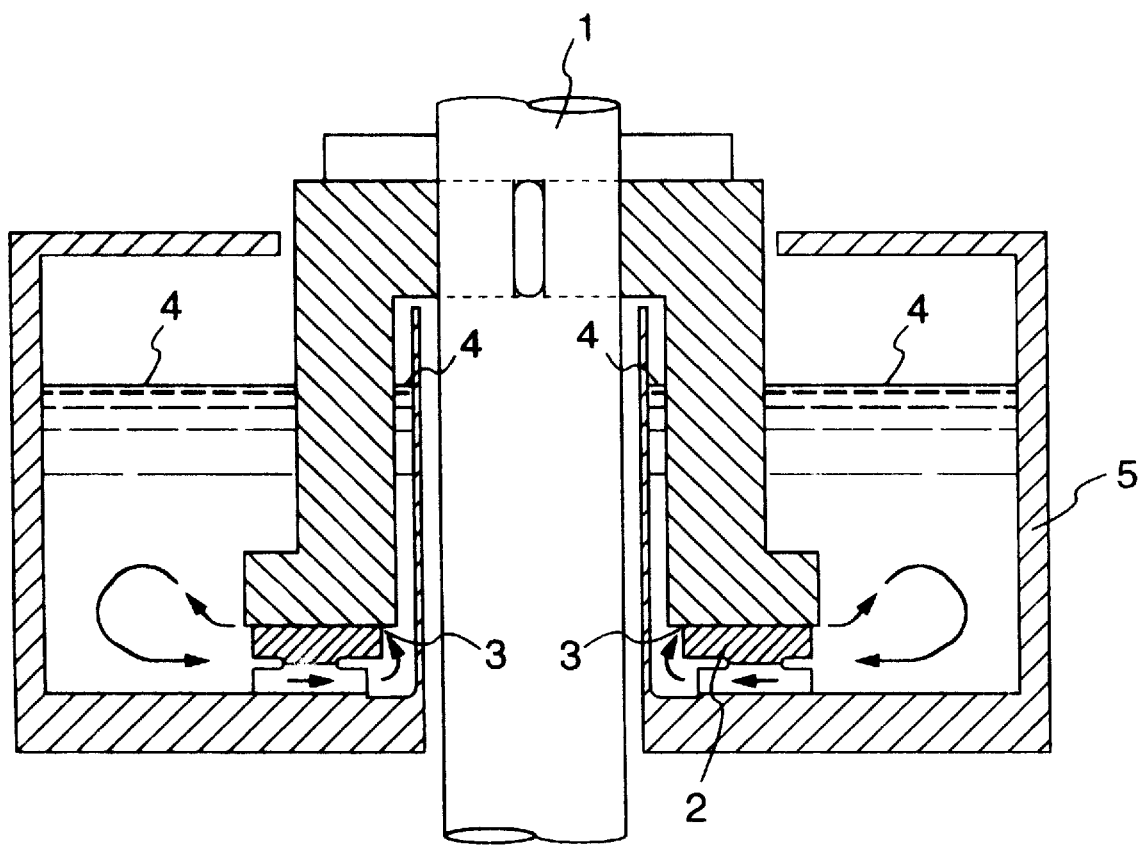
FIG. 4 illustrates the sliding portion of a vertical type pump as an example of a wet type sliding apparatus comprising a thrust bearing which operates in the presence of a lubricating liquid according to this invention.

From the test results shown in Table 1, when the carbon fiber content is 30% by weight, the influences of the PTFE content on the friction coefficient at the time of the starting and the wear are summarized in FIGS. 2 and 3, respectively.

According to FIG. 2, Examples 1 to 4 and Comparative Examples 1 to 3 in which the carbon fiber content is 30% by weight show that the friction coefficient at the time of the starting is as high as 0.13 in Comparative Example 1 in which no PTFE is contained and is gradually decreased to 0.08 as the PTFE content is increased, and when the PTFE content is 8% by weight or more, the friction coefficient becomes substantially constant. From this fact, it can be seen that as to the friction coefficient at the time of the starting, sufficiently good results as a sliding member are obtained. Also, the influence of the carbon fiber content on the friction coefficient at the time of the starting is substantially nil.

FIG. 3 shows the influence of the PTFE content on an amount of wear. Examples 1 to 4 and Comparative Examples 1 to 3 in which the carbon fiber content is 30% by weight show that the amount of wear in Comparative Example 1 in which no PTFE is contained is 7.2 μm, and is quickly reduced therefrom as the PTFE content is increased, and in Example 2 in which the PTFE content is 2% by weight, the amount of wear is the lowest value. And the amount of wear increases gradually until the PTFE content increases to 8.5% by weight (Example 4) and then quickly increases from a PTFE content of 8.5% by weight to a PTFE content of 10% by weight (Comparative Example 2). In a PTFE content of more than 10% by weight, substantially constant amount of wears are shown. As the carbon fiber content increases, a tendency of the wear to reduce is seen.

What is claimed is:

1. A wet type sliding apparatus comprising a thrust bearing which operates in the presence of a lubricating liquid, wherein the thrust bearing has a sliding surface composed of a resin composition comprising a carbon fiber, a fluorocarbon polymer in an amount of 0.5 to 2.3% by weight of the resin composition, and a thermoplastic resin other than fluorocarbon polymer, the carbon fiber content being 10 to 45% by weight based on the weight of the resin composition, said resin composition being optionally disposed on a backing metal.

2. The wet type sliding apparatus according to claim 1, wherein the fluorocarbon polymer is polytetrafluoroethylene, polytetrafluoroethylene-hexafluoropropylene copolymer, polychlorotrifluoroethylene or tetrafluoroethylene-perfluoroalkyl vinyl ether copolymer.

3. The wet type sliding apparatus according to claim 1, wherein the fluorocarbon polymer is polytetrafluoroethylene.

4. A wet type sliding apparatus comprising a thrust bearing which operates in the presence of a lubricating liquid, wherein the thrust bearing is obtained by impregnating and coating a resin composition comprising a carbon fiber, a fluorocarbon polymer and a thermoplastic resin other than fluorocarbon polymer, the carbon fiber content being 10 to 45% by weight based on the weight of the resin composition and the fluorocarbon polymer content being 0.1 to 8.5% by weight of the resin composition, on the surface of a porous sintered layer backed with a backing metal.

5. The wet type sliding apparatus according to claim 4, wherein the fluorocarbon polymer is polytetrafluoroethylene, polytetrafluoroethylene-hexafluoropropylene copolymer, polychlorotrifluoroethylene or tetrafluoroethylene-perfluoroalkyl vinyl ether copolymer.

6. The wet type sliding apparatus according to claim 4, wherein the fluorocarbon polymer is polytetrafluoroethylene.

7. The wet type sliding apparatus according to claim 4, wherein the fluorocarbon polymer content is 0.1 to 5% by weight.

8. The wet type sliding apparatus according to claim 4, wherein the fluorocarbon polymer content is 0.5 to 2.3% by weight.

9. The wet type sliding apparatus according to claim 4, wherein the carbon fiber content is 25 to 35% by weight.

10. The wet type sliding apparatus according to claim 4, wherein the carbon fiber has a fiber length of 0.1 to 10 mm.

11. The wet type sliding apparatus according to claim 4, wherein the balance of the resin composition is substantially a thermoplastic resin other than fluorocarbon polymer.

12. The wet type sliding apparatus according to claim 4, wherein the thermoplastic resin other than fluorocarbon polymer is at least one member selected from the group consisting of an aromatic polyetherketone and a polyarylene sulfide.

13. The wet type sliding apparatus according to claim 4, wherein the thermoplastic resin other than fluorocarbon polymer is an aromatic polyetherketone.

14. The wet type sliding apparatus according to claim 13, wherein the aromatic polyetherketone is polyetheretherketone.

15. The wet type sliding apparatus according to claim 4, wherein the thermoplastic resin other than fluorocarbon polymer is polyarylene sulfide.

16. The wet type sliding apparatus according to claim 15, wherein the polyarylene sulfide is polyphenylene sulfide.

17. A wet type sliding apparatus comprising a thrust bearing which operates in the presence of a lubricating liquid, wherein the thrust bearing has a sliding surface composed of a resin composition comprising a carbon fiber, a fluorocarbon polymer and a thermoplastic resin other than fluorocarbon polymer, the carbon fiber content being 10 to 45% by weight based on the weight of the resin composition and the fluorocarbon polymer content being 0.1 to 8.5% by weight of the resin composition, said resin composition being impregnated into and coated onto the surface of a porous sintered layer backed with a backing metal.

* * * * *